United States Patent
Lee (10) Patent No.: US 8,913,664 B2
(45) Date of Patent: Dec. 16, 2014

(54) THREE-DIMENSIONAL MOTION MAPPING FOR CLOUD GAMING

(75) Inventor: Hung-Ju Lee, Pleasanton, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 337 days.

(21) Appl. No.: 13/235,042

(22) Filed: Sep. 16, 2011

(65) Prior Publication Data
US 2013/0072299 A1 Mar. 21, 2013

(51) Int. Cl.
| | |
|---|---|
| H04N 7/50 | (2006.01) |
| H04N 19/583 | (2014.01) |
| H04N 19/553 | (2014.01) |
| H04N 19/54 | (2014.01) |
| G06T 9/00 | (2006.01) |
| H04N 19/436 | (2014.01) |
| H04N 19/51 | (2014.01) |
| H04N 19/53 | (2014.01) |
| H04N 19/597 | (2014.01) |

(52) U.S. Cl.
CPC ....... H04N 19/006 (2013.01); H04N 19/00733 (2013.01); H04N 19/00648 (2013.01); H04N 19/00769 (2013.01); H04N 19/00618 (2013.01); A63F 2300/538 (2013.01); G06T 9/00 (2013.01); H04N 19/00521 (2013.01); H04N 19/00684 (2013.01)
USPC .................................................. 375/240.16

(58) Field of Classification Search
CPC .................. A63F 13/00; A63F 9/24
USPC ........................... 375/240, 240.16
See application file for complete search history.

(56) References Cited

U.S. PATENT DOCUMENTS

| | | | |
|---|---|---|---|
| 6,160,574 A * | 12/2000 | Oba et al. | 348/46 |
| 2002/0106135 A1* | 8/2002 | Iwane | 382/305 |
| 2003/0229719 A1* | 12/2003 | Iwata et al. | 709/247 |
| 2005/0207500 A1* | 9/2005 | Bober | 375/240.22 |
| 2005/0276323 A1* | 12/2005 | Martemyanov et al. | 375/240.03 |
| 2006/0062308 A1* | 3/2006 | Staelin et al. | 375/240.18 |
| 2009/0207172 A1* | 8/2009 | Inoue et al. | 345/427 |
| 2010/0034420 A1* | 2/2010 | Xiong et al. | 382/100 |
| 2011/0105898 A1* | 5/2011 | Guthart et al. | 600/437 |
| 2011/0134221 A1* | 6/2011 | Lee et al. | 348/46 |
| 2011/0249188 A1* | 10/2011 | Cheng et al. | 348/699 |
| 2012/0251014 A1* | 10/2012 | Watanabe et al. | 382/233 |
| 2012/0298859 A1* | 11/2012 | Tanji et al. | 250/282 |

FOREIGN PATENT DOCUMENTS

WO WO 2011134922 * 11/2011

* cited by examiner

Primary Examiner — Richard Torrente
Assistant Examiner — Irfan Habib
(74) Attorney, Agent, or Firm — Joshua D. Isenberg; JDI Patent (57) ABSTRACT

Three-dimensional motion mapping is disclosed. A reverse three-dimensional transform for a set of anchor pixels in the current frame is performed using a model-view matrix, a projection matrix, and view parameters associated with the computer game. Reverse transformed anchor pixels are indicated as occluded if the estimated depth for the pixel in the previous frame is greater than a real depth for the pixel in the previous frame or otherwise indicated as visible. A motion vector map for a subset of the reverse transformed pixels is constructed. A best target motion vector for a first set of sections in the current frame is derived or motion estimation is performed for sections in a second set that contain occluded pixels. Target motion vectors for groups of two or more sections of the current frame comprising two or more adjoining sections each with best target motion vectors are derived.

17 Claims, 8 Drawing Sheets

THREE-DIMENSIONAL MOTION MAPPING FOR CLOUD GAMING

FIELD OF THE INVENTION

Embodiments of this invention are related to digital video coding and more particularly to three-dimensional motion mapping.

BACKGROUND OF THE INVENTION

Computer gaming has been moving away from the traditional video game console towards cloud-based gaming. Cloud-based gaming is a type of online gaming that allows direct and on-demand streaming of games onto a computer through the use of a thin client. Certain game software and game data is stored on a remote server and is streamed directly to user devices accessing the server through the client. Cloud-based gaming systems can be characterized as a combination of the following key components: a powerful game rendering engines and video encoding engines at remote data center sites, a resource-limited (e.g., limited computing/rendering power with video decoding engine) thin client (e.g., mobile phone, portable game device, tablet computer, consumer electronic device, etc.), and high bandwidth and reliable networks. Playing games on cloud systems has mass appeal and provides gamers with a brand new game playing experience.

A major hurdle in developing seamless cloud gaming systems is latency. Unlike console based gaming, which is locally equipped with a high performance computing machine and a powerful graphic rendering engine, cloud based gaming systems are often technically restricted by long latency. Long latency can largely be attributed to (1) processing delays by graphics rendering, (2) processing delays by video encoding, and (3) network round trip traffic delays.

From the viewpoint of video encoding, delays are often caused by the computationally intensive and GPU-unfriendly motion search, which is widely used in modern video technology.

It is within this context that embodiments of the present invention arise.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Embodiments of this invention provide a new approach for improving latency issues associated with cloud gaming systems. Instead of further optimizing the traditional motion search algorithm with more powerful CPU-based single instruction multiple data (SIMD) instructions, latency can be reduced by bridging both processing engines (e.g., game engine and video engine) using geometric information to potentially reduce or replace motion search. This approach proposes to utilize intermediate results and geometric information from a pipelined game engine, so that the motion vector can be constructed quickly and precisely, thereby significantly reducing processing delays.

Figure 1A:
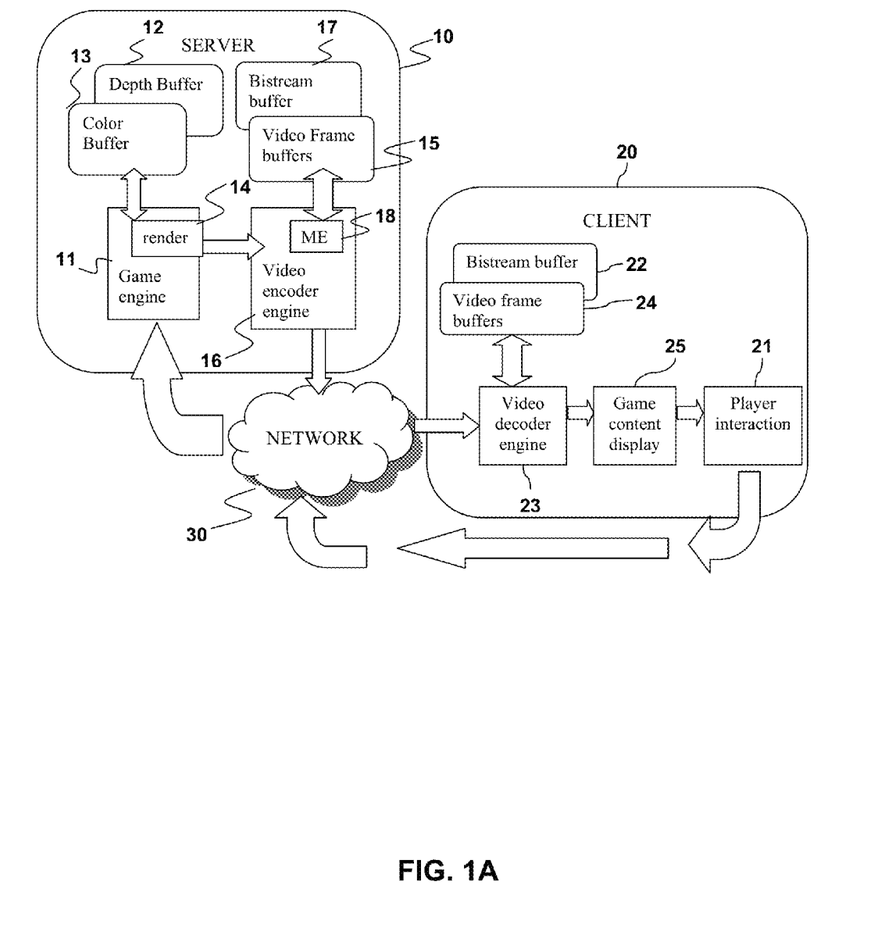
FIG. 1A is a block diagram illustrating motion mapping of a video in a cloud-based gaming application.

By way of example, as see in FIG. 1A, in a cloud-based video game a server 10 and client 20 are connected via a network 30. The network 30 may be any suitable computer/telecommunications network, e.g., Ethernet, WiFi, 3G, 4G, internet protocol (IP) networks.

A video game typically generates a set of video sequences that depict various environments to facilitate interaction with a user. At the client 20 a user's interactions with the game environments are typically received in the form of commands from some sort of interface 21, e.g., a joystick, motion sensor, video camera, microphone array or other input device. Data representing these interactions are transmitted over the network 30 to the server 10, which interprets the interaction data and later the interpreted interaction data can be used by a game engine 11 to perform desired operations. The interaction data may include the locations and movements of objects (including, but not limited to, player characters or avatars) in a game environment. The game engine 11 takes into account the locations and movements of objects within the game environments and applies a set of rules for interactions involving these objects.

The game engine 11 can typically keep track of the locations of objects in three dimensions. Depth information for objects is stored in a depth buffer 12 and color information is stored in a color buffer 13. The game engine 11 may include a rendering engine 14 that can generate a video image depicting a scene of the environment. The rendering engine 14 may determine a virtual camera position from which the three dimensional environment is to be viewed and generate a corresponding video frame, e.g., using information from the depth buffer 12 and color buffer 13. The rendering engine 14 may use other information or results in addition to information from the depth buffer 12 and color buffer 13, such as lighting source information generated by the game engine 11, to generate the video frame. By repeating this process at regular intervals (or on an as needed basis), the game engine 11 can produce video sequences made up of individual video frames, which may be temporarily stored in a video frame buffer 15. It is noted that, the process can be repeated at irregular intervals. For example, for video game contents, it is very likely for there to be no object movement or content change for two or more frames. In this case, it is not necessary to encode those duplicated frames. Instead, the repeated frame may be encoded once and send out. Each video frame may be partitioned into several different segments in order to facilitate processing (e.g., rendering, encoding, decoding, etc.). The data for video image is compressed and encoded by a video encoder engine 16 to form a bitstream, which may be stored in a bitstream buffer 17 before it is transmitted over the network 30. Part of the encoder engine 16 is a motion estimator 18, which compresses the video frame data by encoding differences between a current frame and a previous frame.

At the client 20, the bitstream may be temporarily stored in a bitstream buffer 22 before being sent to a video decoder engine 23 that decodes the bitstream to video image data. The video image data may be temporarily stored in a video frame buffer 24 before it is presented on a display 25.

Figure 1B:
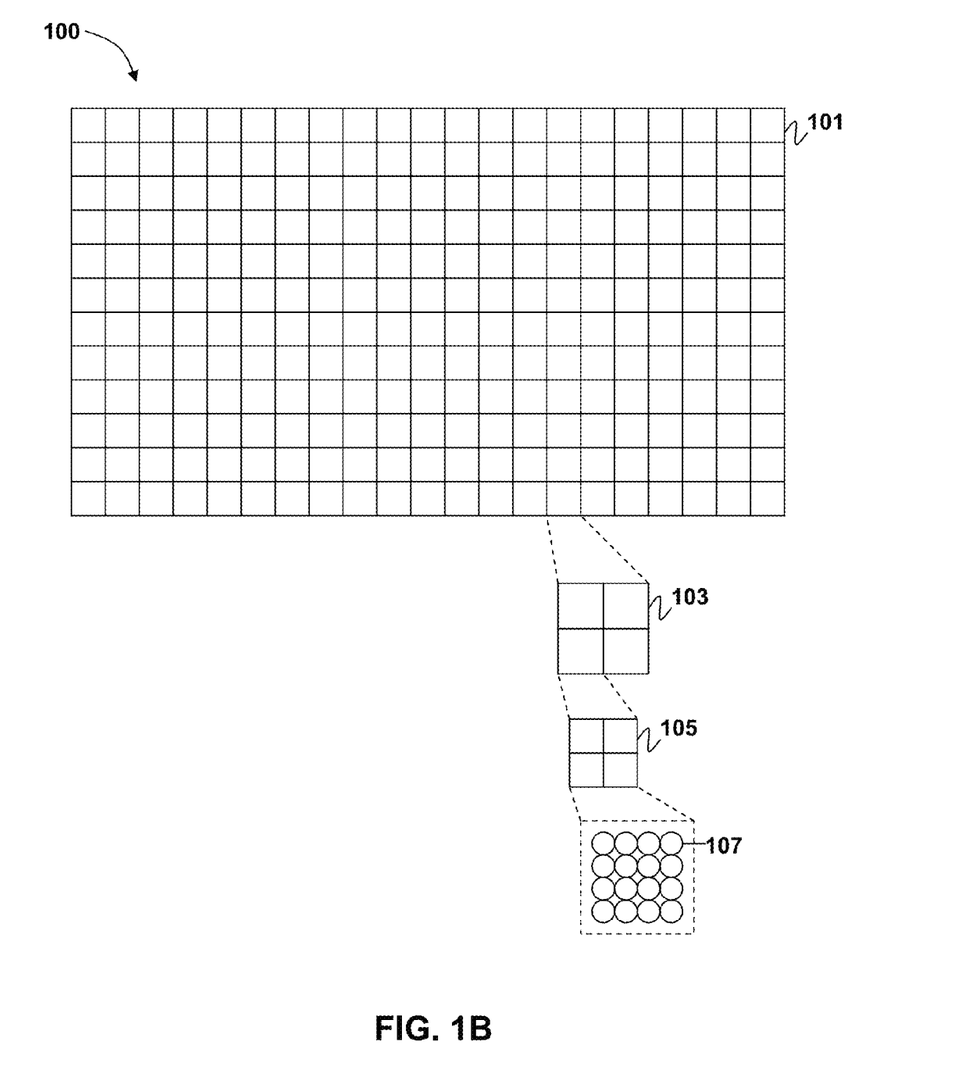
FIG. 1B is a schematic diagram illustrating an example of a partitioning scheme for a video frame in accordance with an embodiment of the present invention.

FIG. 1B is a schematic diagram illustrating an example of a partitioning scheme for a video frame in accordance with an embodiment of the present invention. By way of example, and not by way of limitation, as shown in FIG. 1B, a single picture 100 (e.g., a digital video frame) may be broken down into one or more sections. As used herein, the term "section" can refer to a group of one or more pixels within the picture 100. A section can range from a single pixel within the picture, up to the whole picture. Non-limiting examples of sections include slices 102, macroblocks 104, sub-macroblocks 106, blocks 108 and individual pixels 110. As illustrated in FIG. 1A, each slice 102 contains one or more rows of macroblocks 104 or portions of one or more such rows. The number of macroblocks in a row depends on the size of the macroblocks and the size and resolution of the picture 100. For example, if each macroblock contains sixteen by sixteen pixels then the number of macroblocks in each row may be determined by dividing the width of the picture 100 (in pixels) by sixteen. Each macroblock 104 may be broken down into a number of sub-macroblocks 106. Each sub-macroblock 106 may be broken down into a number of blocks 108 and each block may contain a number of pixels 110. By way of example, and without limitation of the invention, in a common video coding scheme, each macroblock 104 may be broken down into four sub-macroblocks 106. Each sub-macroblock may be broken down into four blocks 108 and each block may contain a four by four arrangement of sixteen pixels 110.

Figure 2A:
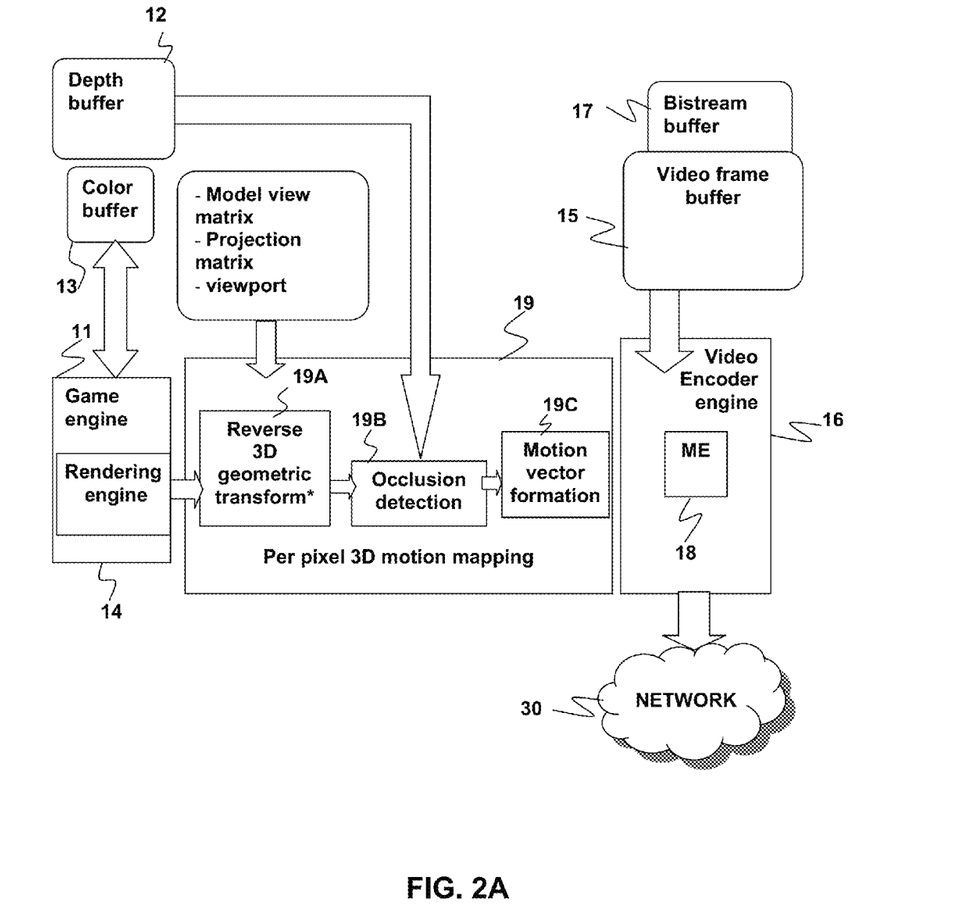
FIG. 2A is a block diagram illustrating 3-D motion mapping of a video according to an embodiment of the present invention.

FIGS. 2A-2D illustrate a method for 3-D motion mapping of video frames that may be used in the context of cloud gaming. As seen in FIG. 2A, the server 10 may be modified to include a 3D motion mapping engine 19 that implements reverse 3D geometric transformation 19A, occlusion detection 19B and motion vector formation 19C. These processes can be understood with reference to FIG. 2B, FIG. 2C, and FIG. 2D.

It is noted that it is not necessary to do 3D motion mapping for every pixel, although it is within the scope of embodiments of the present invention to do so. To further speed up the mapping, the server can selectively pick some "anchor" pixels within each video frame and perform the reverse 3D geometric transformation 19A to generate reverse transformed anchor pixels. Occlusion detection 19B and motion vector formation 19C may then be performed only on the resulting reverse transformed anchor pixels without significantly degrading the search results. By way of example, and not by way of limitation, the server 10 may choose every other pixel in a frame in both the vertical and horizontal directions as anchor pixels. This would reduce by three-quarters the number of pixels for which 3D motion mapping is done. The anchor pixels may be chosen in any suitable fashion, e.g., they may be selected according to some other pattern or even randomly selected. Embodiments of the invention are not limited by the fashion in which the anchor pixels are chosen.

Figure 2B:
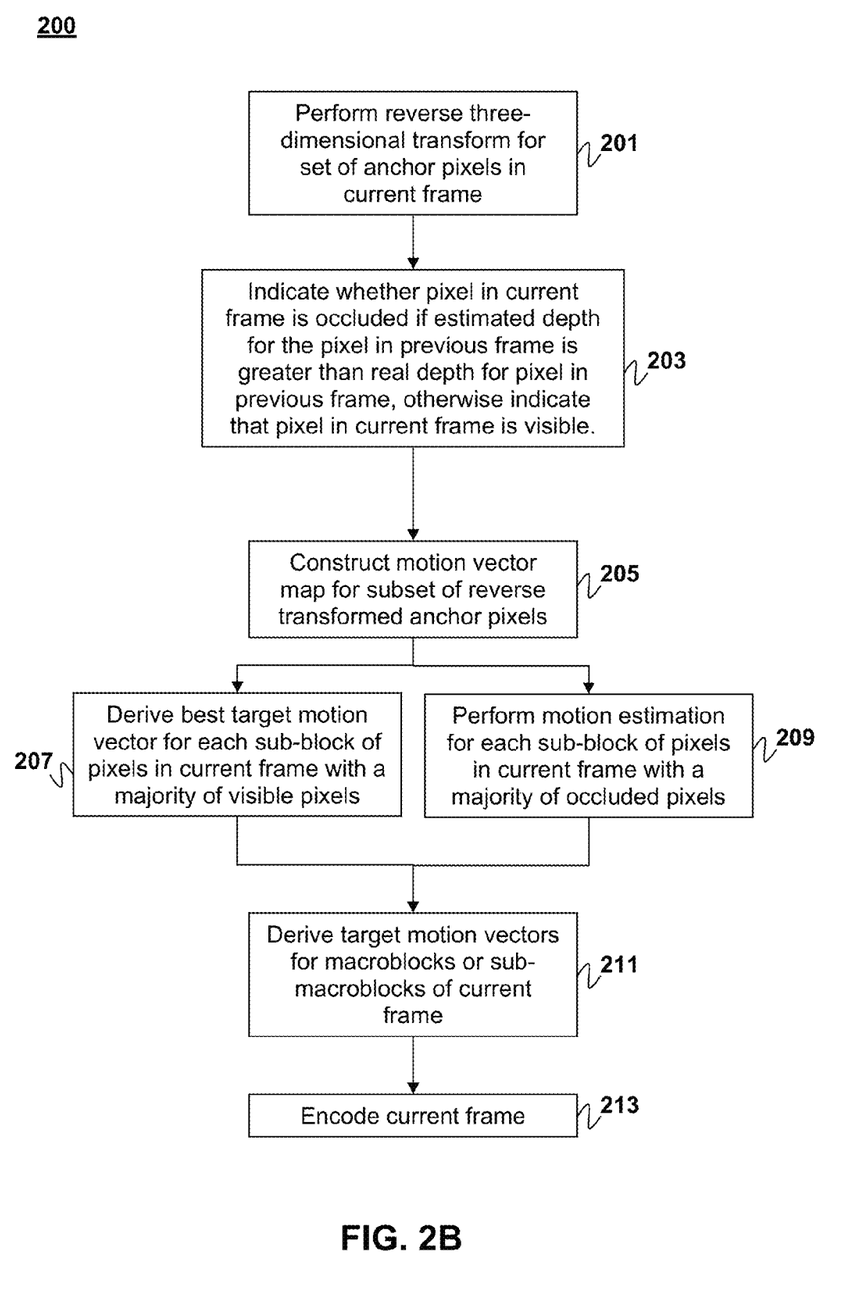
FIG. 2B is a flow diagram illustrating a method of 3-D motion mapping of a video according to an embodiment of the present invention.
Figure 2C:
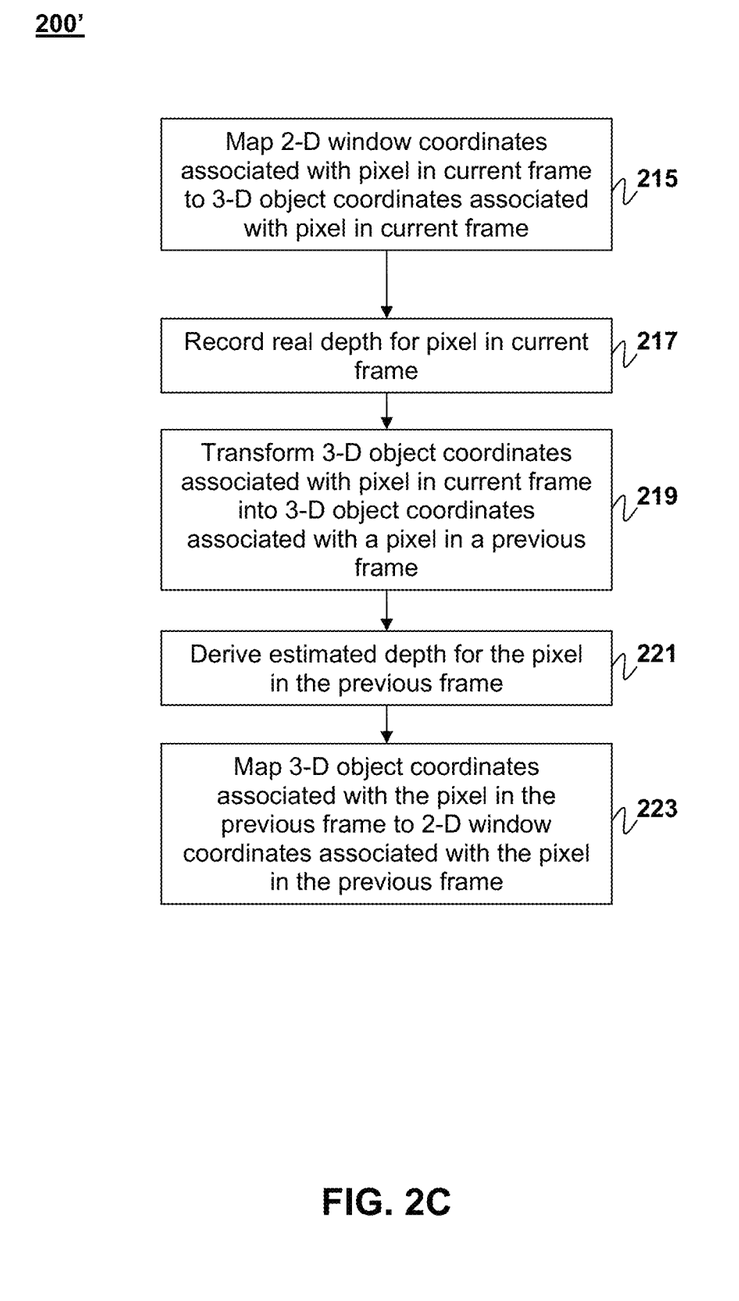
FIG. 2C is a flow diagram detailing the steps of 3-D reverse three-dimensional transformation from FIG. 2A according to an embodiment of the present invention.
Figure 2D:
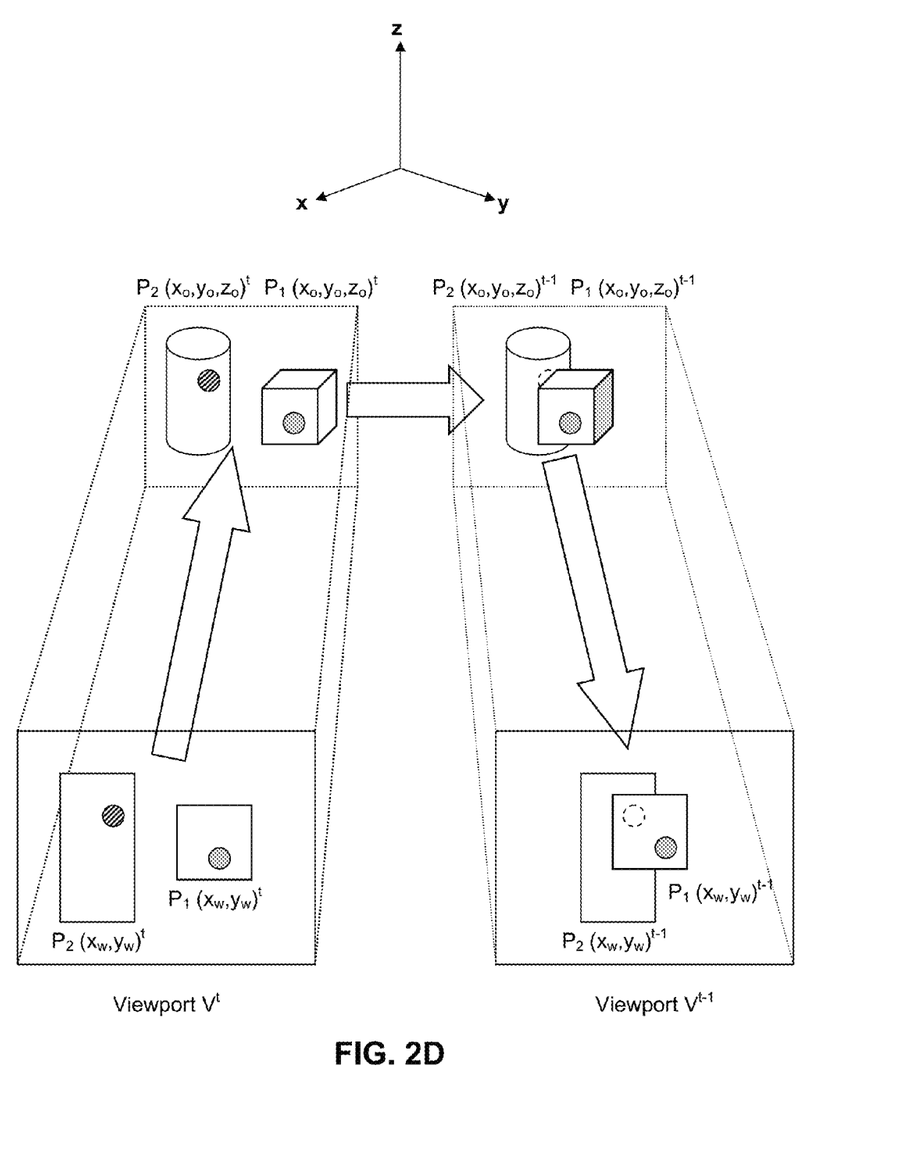
FIG. 2D is a schematic diagram illustrating the steps of 3-D reverse transformation from FIG. 2B according to an embodiment of the present invention.

FIG. 2B is a flow diagram illustrating a method 200 of 3-D motion mapping of a video according to an embodiment of the present invention. FIG. 2C is a flow diagram detailing the steps 200' of 3-D reverse three-dimensional transformation from FIG. 2B according to an embodiment of the present invention. FIG. 2D is a schematic diagram illustrating the steps of 3-D reverse transformation from FIG. 2C according to an embodiment of the present invention.

Referring to FIG. 2B, a current video frame in a sequence of video frames undergoes 3-D motion mapping. Initially, a reverse three-dimensional transform 19A is performed for a set of pixels (e.g., a set of anchor pixels, as discussed above) in the current frame as indicated at 201. The set of pixels may include all pixels in the current frame or some subset of all pixels, e.g., every other pixel in the vertical and horizontal direction or some other subset of pixels at different locations in the current frame. The reverse three-dimensional transform is performed in order to establish a relationship between pixels in the current video frame and pixels in a previous video frame. The reverse three-dimensional transform involves several steps, which are depicted as a second flow diagram in FIG. 2C. FIG. 2C is supplemented by FIG. 2D, which provides a schematic diagram detailing the steps for performing a reverse three-dimensional transform.

Referring now to FIG. 2C and the steps for performing a reverse three-dimensional transform, for a given pixel in a video frame, the two-dimensional window coordinates associated with the pixel are first mapped to 3-D object coordinates associated with the pixel as described at 215. This is illustrated in FIG. 2C, with a first pixel denoted by 2-D window coordinates: $P_1(x_w, y_w)^t$ being mapped to its 3-D object coordinates: $P_1(x_o, y_o, z_o)^t$. The subscript "w" is used to denote window coordinates and the subscript "o" is used to denote object coordinates. The superscript "t" is used to denote the current frame. The 2-D window coordinates may be mapped to 3-D object coordinates using a model-view matrix, a projection matrix, and view parameters associated with the computer game.

The model-view matrix is a matrix representing the current transformation, as determined by the various translations, rotations and scaling operations. Basically model-view matrix describes the change of position, orientation, and scaling of the object in 3-D space.

The projection matrix is a matrix representing the way in which an object in 3-D space is viewed in 2-D space. An example of such a projection is shown in the right-hand side of FIG. 2D, where $P_1(X_o, Y_o, Z_o)^{t-1}$ in 3D space is projected to $P_1(X_w, Y_w)^{t-1}$ in 2D space.

The mapping may be done by first normalizing the object coordinates and then multiplying a vector representing the normalized object coordinates by the matrix product of the inverse of the model-view matrix with the projection matrix. By way of example, and not by way of limitation, in OpenGL, the gluUnProject( ) API may be used to perform this mapping of the 2-D window coordinates to 3-D object coordinates.

The view parameters specify the location and dimensions of rectangular windows on the screen for displaying a portion of the image/video contents. The rectangular windows are called a "view ports". The view parameters typically include four values that specify the location and size of a window showing the contents on a screen. The window may be a full screen or some rectangular portion of the full screen. By way of example, and not by way of limitation, a view port may be represented in OpenGL as (x, y, width, and height) in, where (x,y) refer to the location of lower left corner of the viewport rectangle and width, height refer to the width and height of the window.

After the 2-D window coordinates of a pixel in the current frame has been mapped to its 3-D object coordinates, a real depth for the resulting reverse transformed pixel is recorded as described at 217. This real depth will be subsequently used to facilitate occlusion detection 19B, which is discussed in further detail below. It is noted that the term "real depth" is used to distinguish the depth for the pixel in the current from an "estimated depth", which is described below.

The 3-D object coordinates associated with a reverse transformed pixel in the current frame are then transformed into 3-D object coordinates associated with a pixel in a previous frame as described at 219. This is illustrated in FIG. 2D, with the 3-D object coordinates of the first pixel in the current frame: $P_1(x_o,y_o,z_o)^t$ being transformed into 3-D object coordinates of a first pixel in a previous frame: $P_1(x_o,y_o,z_o)^{t-1}$. The superscript "t−1" is used to denote the previous frame, i.e., the frame preceding the current frame "t". Viewport $V^t$ refers to the viewport for the current video frame and viewport $V^{t-1}$ refers to the viewport for the previous video frame. The 3-D object coordinates of the pixel in the current frame may be mapped to 3-D object coordinates of a pixel in a previous frame using the model-view matrix, the projection matrix, and the view parameters associated with the computer game.

After the 3-D object coordinates of the pixel in the current frame have been transformed into 3-D object coordinates of a first pixel in a previous frame, an estimated depth for the pixel in the previous frame is derived as described at 221. The estimated depth of the pixel in the previous frame will be subsequently used to facilitate occlusion detection, which will be discussed in further detail below.

The 3-D object coordinates associated with the pixel in the previous frame are then mapped into 2-D window coordinates associated with the pixel in the previous frames as described at 223. This is illustrated in FIG. 2C, with the 3-D object coordinates of the first pixel in the previous frame: $P_1(x_o,y_o,z_o)^{t-1}$ being mapped into 2-D window coordinates of the first pixel in the previous frame: $P_1(x_w,y_w)^{t-1}$. The 3-D object coordinates of the pixel in the previous frame may be mapped to 2-D window coordinates using the model-view matrix, the projection matrix, and view parameters associated with the computer game. After a pixel in the current frame has undergone reverse three-dimensional transform, the model-view matrix, the projection matrix, and the view parameters are updated accordingly.

This concludes the process of performing a reverse three-dimensional transform. The entire process can be summarized mathematically as follows: $2D(x_w^t,y_w^t) \rightarrow 3D(x_o^t,y_o^t,z_o^t) \rightarrow 3D(x_o^{t-1},y_o^{t-1},z_w^{t-1}) \rightarrow 2D(x_w^{t-1},y_w^{t-1})$. The three-dimensional transform provides the video encoder engine 16, specifically the motion estimator 18, with critical information indicating relationships between pixels in a current frame and pixels in a previous frame that are used to simplify and speed up a subsequent encoding process.

A second pixel with window coordinates $P_2(x_w,y_w)^t$ also undergoes a reverse three-dimensional transform. The reverse three-dimensional transform generates 2-D window coordinates for the second pixel in the previous frame $(P_2(x_w, y_w)^{t-1})$.

After the reverse three-dimensional transform 19A is completed, occlusion detection 19B is performed for each pixel in the current video frame. A pixel is occluded if the estimated depth of the pixel in the previous frame is greater than a real depth for the pixel in the previous frame as indicated at 203.

A pixel is visible if the estimated depth of the pixel in the previous frame is less than a real depth for the pixel in the previous frame as indicated at 203. To determine whether the 2-D window coordinates of the first pixel in the previous frame $(P_1(x_w,y_w)^{t-1})$ are occluded, two parameters, a real depth for the first pixel in the previous frame $(D^{t-1})$ and an estimated depth for the first pixel in the previous frame $(d^{t-1})$ are compared.

In FIG. 2D, the first pixel in the current frame is successfully transformed back to its position in the previous frame. However, the second pixel in the current frame, when mapped back to its position in the previous frame, is occluded, as indicated by the dashed dot. Once occlusion detection has been completed for each pixel in the current frame, a complete per pixel motion vector map is constructed for the current frame as indicated at 205. For a pixel that is successfully transformed back to its position in the previous frame (i.e., visible), its motion vector can be calculated as the difference between the 2-D window coordinates of the pixel in the current frame $(P(x_w,y_w)^t)$ and the 2-D window coordinates of the pixel in the previous frame $(P(x_w,y_w)^{t-1})$. However for a pixel that is unsuccessfully transformed back to its position in the previous frame (i.e., occluded), regular motion estimation must be performed in order to calculate a motion vector for the pixel in the current frame.

A best target motion vector may be derived for each section in a first set of sections in the current frame using motion vector map or motion estimation may be performed for each section in a second set of sections in the current frame that include occluded pixels using the motion vector map.

It is noted that it is not necessary to do motion vector mapping for each pixel in the frame or even for each reverse transformed pixel corresponding to an anchor pixel for which reverse 3D transformation was. However, the reverse transform pixels generated by the reverse 3D transform are a superset of those pixels for which the motion vector mapping is done. In other words, in the motion vector map can be generated using some or all the reverse transformed "anchor" pixels that were generated as a result of performing the reverse 3D transform on the "anchor" pixels.

By way of example, and not by way of limitation, the individual pixels may then be grouped into sub-blocks (4×4 block of pixels) in order to form a common motion vector for that group of pixels. A best target motion vector may be derived for each section (e.g., each sub-block of pixels) in the current frame with a majority of visible pixels as indicated at 207. By way of example, and not by way of limitation, the best target motion vector MV for a 4×4 sub-block may be derived using the following criteria:

$$\min\left\{\sum_{i=0}^{i=15} [\lambda \cdot R(mv_i - MV) + (Dist\{P_i^t - P_i^{t-1} \mid MV\})]\right\},$$

wherein $mv_i$ refers to an individual pixel motion vector, R is the rate in bits to encoder the motion vector difference, Dist denotes the distortion, which can be represented, for example, in absolute difference and λ refers to a Lagrange parameter which is used to optimize the cost function, as shown above. It is common to include the value of λ in the cost function to find out the rate distortion optimal solution.

This step essentially minimizes the cost for encoding the motion vector and the distortion given the target motion vector MV. For each sub-block of pixels in the current frame with a majority of occluded pixels, motion estimation may be performed in order to derive a corresponding best target motion vector as indicated at 209.

Sections may be grouped into larger a group involving multiple sections in order to form a target motion vector for the group. For example, sub-blocks may then be grouped into sub-macroblocks (8×8 block of pixels) in order to form a target motion vector for that group of pixels as indicated at 211. A target motion vector for a sub-macroblock may be derived from its descendant 4 sub-block best target motion vectors based on the following criteria:

$$\min\left\{\sum_{i=0}^{i=3} [\lambda \cdot R(mv_i - MV) + (Dist\{P_i^t - P_i^{t-1} \mid MV\})]\right\}.$$

Sub-macroblocks may be further grouped into macroblocks (16×16 block of pixels) in order to form a target motion vector for that group of pixels as indicated at 211. In a similar fashion to the formation of a target motion vector for a sub-macroblock, the target motion vector for a macroblock may be derived from its descendant 4 sub-macroblock target motion vectors. The grouping of pixels in a hierarchical manner is known as a pyramid scheme.

Finally, the current frame may be encoded as indicated at 213. The current frame will be encoded using the derived best target motion vectors and target motion vectors in order to simplify the complexity of the encoding procedure. By associating pixels in a current frame with corresponding pixels in a previous frame, motion estimation may be significantly avoided during the encoding process, saving processing time and minimizing latency.

Figure 3:
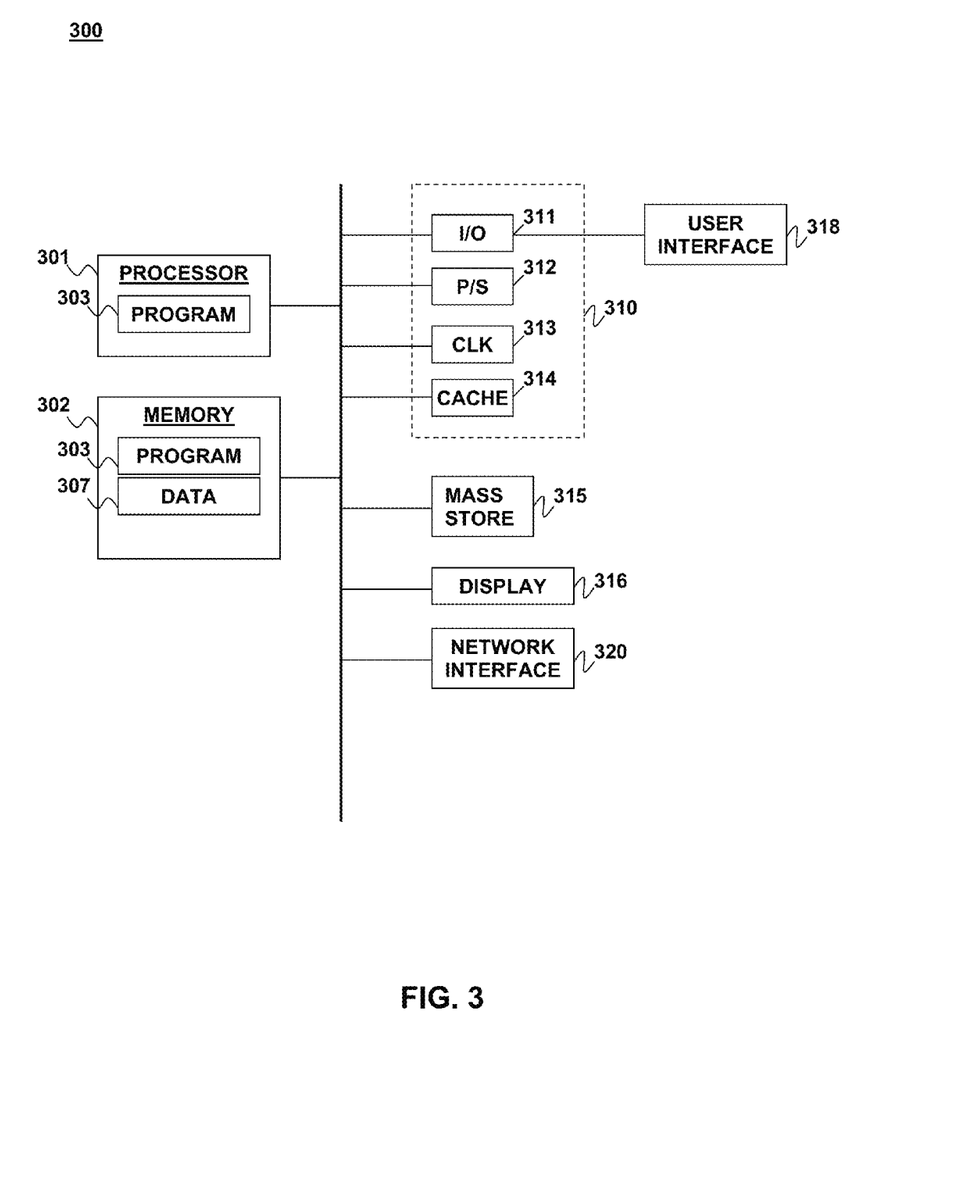
FIG. 3 is a block diagram illustrating a computer apparatus that may be used to implement a method for three-dimensional motion mapping according to an embodiment of the present invention.

FIG. 3 illustrates a block diagram of a computer apparatus 300 that may be used to implement the method for three-dimensional motion mapping described above. The apparatus 300 generally may include a processor module 301 and a memory 302. The processor module 301 may include one or more processor cores. In some cases, each processor core in the module 301 may have a dedicated local memory (not shown).

The memory 302 may be in the form of an integrated circuit, e.g., RAM, DRAM, ROM, and the like. The memory may also be a main memory that is accessible by all of the processor modules 301. In some embodiments, the processor module 301 may include local memories associated with each core. A program 303 may be stored in the main memory 302 in the form of processor readable instructions that can be executed on the processor modules. The program 303 may be configured to perform three-dimensional motion mapping as described above with respect to FIGS. 2A and 2B. The program 303 may be written in any suitable processor readable language, e.g., C, C++, JAVA, Assembly, MATLAB, FORTRAN and a number of other processor readable languages. Data 307 may be stored in the memory 302. Such data may include 2-D window coordinates, 3-D object coordinates, estimated depth information, actual depth information, model view matrices, projection matrices, and view parameters. During execution of the program 303, portions of program code and/or data 307 may be loaded into the memory 302 or the local stores of processor cores for parallel processing by multiple processor cores. The data 307 may also include rendered video frames or encoded bitstreams, which may be stored in suitably configured buffers. The program may also be configured to implement the functions of the game engine 11 and video encoder engine 16, e.g., as described above.

The apparatus 300 may also include well-known support functions 310, such as input/output (I/O) elements 311, power supplies (P/S) 312, a clock (CLK) 313 and cache 314. The apparatus 300 may optionally include a mass storage device 315 such as a disk drive, CD-ROM drive, tape drive, or the like to store programs and/or data. The device 300 may also optionally include a display unit 316 and user interface unit 318 to facilitate interaction between the apparatus 300 and a user. The display unit 316 may be in the form of a cathode ray tube (CRT) or flat panel screen that displays text, numerals, graphical symbols or images. The user interface 318 may include a keyboard, mouse, joystick, light pen or other device that may be used in conjunction with a graphical user interface (GUI). The apparatus 300 may also include a network interface 320 to enable the device to communicate with other devices over a network, such as the internet. These components may be implemented in hardware, software or firmware or some combination of two or more of these.

Figure 4:
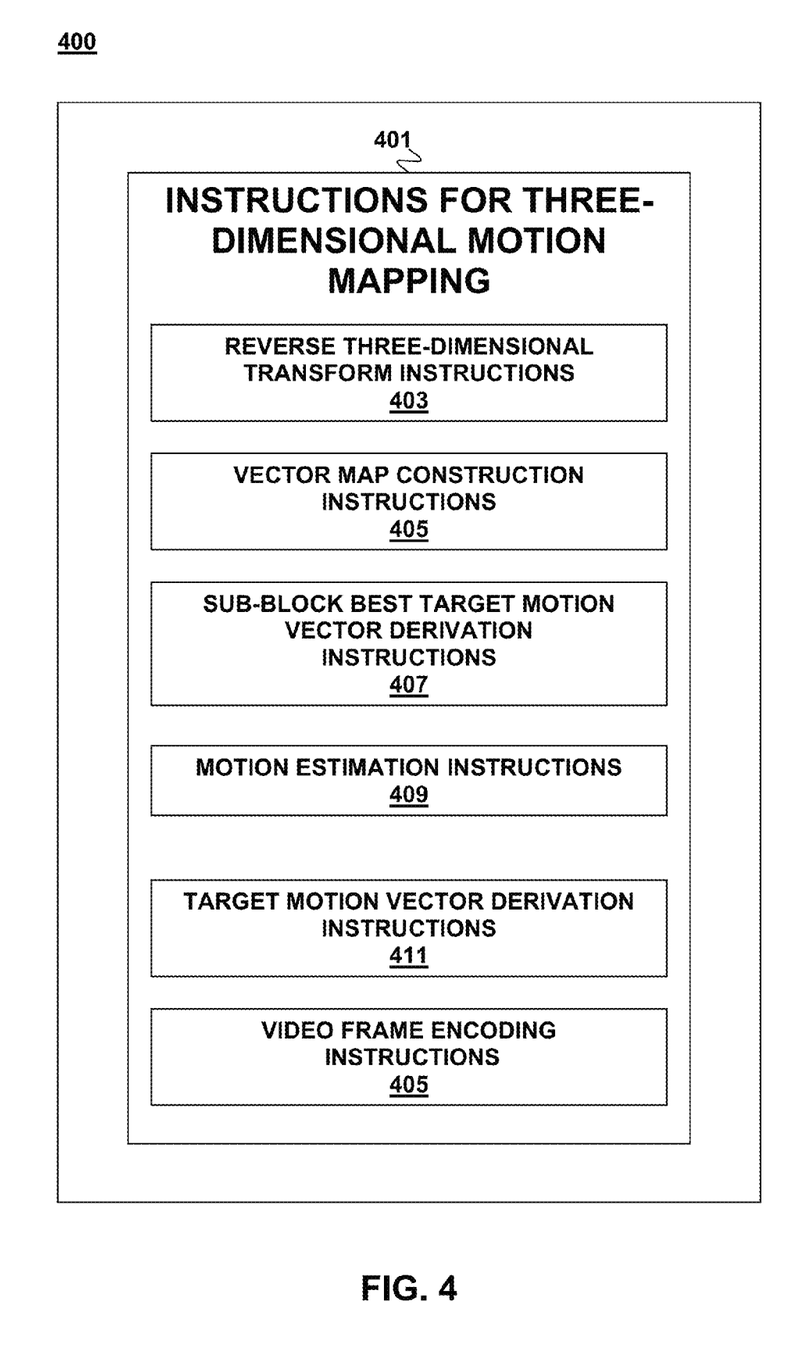
FIG. 4 is a block diagram of a computer readable medium containing computer readable instructions for implementing a method for three-dimensional motion mapping according to an embodiment of the present invention.

According to another embodiment, instructions for carrying out three-dimensional motion mapping as described above may be stored in a computer readable storage medium. By way of example, and not by way of limitation, FIG. 4 illustrates an example of a computer-readable storage medium 400. The storage medium contains computer-readable instructions stored in a format that can be retrieved and interpreted by a computer processing device. By way of example, and not by way of limitation, the computer-readable storage medium 400 may be a computer-readable memory, such as random access memory (RAM) or read only memory (ROM), a computer readable storage disk for a fixed disk drive (e.g., a hard disk drive), or a removable disk drive. In addition, the computer-readable storage medium 400 may be a flash memory device, a computer-readable tape, a CD-ROM, a DVD-ROM, a Blu-ray, HD-DVD, UMD, or other optical storage medium.

The storage medium 400 contains instructions for three-dimensional motion mapping 401 configured to implement a method of three-dimensional motion mapping in accordance with the method described above with respect to FIGS. 2A-2D. The storage medium 400 may optionally contain reverse three-dimensional transform instruction 403 that are used to perform a reverse three-dimensional transform for each pixel in a current video frame of a video game. For each pixel in a current video frame, the reverse three-dimensional transform instructions 403 may involve: mapping two-dimensional window coordinates associated with the pixel in the current frame to three-dimensional object coordinates associated with the pixel in the current frame; recording a real depth for the pixel in the current frame; transforming the three-dimensional object coordinates associated with the pixel in the current frame into three-dimensional object coordinates associated with a pixel in a previous frame; deriving an estimated depth for the pixel in the previous frame; mapping the three-dimensional object coordinates associated with the pixel in the previous frame to two-dimensional window coordinates associated with the pixel in the previous frame; and indicating that the pixel in the current frame is occluded if the estimated depth for the pixel in the previous frame is greater than a real depth for the pixel in the previous frame, otherwise indicating that the pixel in the current frame is visible.

The instructions for three-dimensional motion mapping 401 may also include constructing vector map instructions 405 that are used to construct a per pixel motion vector map for the current frame using the information derived from implementing the reverse three-dimensional transform instructions 403.

The instructions for three-dimensional motion mapping 401 may also include deriving sub-block best target motion vector instructions 407 that are used to derive a best target motion vector for each sub-block of pixels in the current frame with a majority of visible pixels. As discussed above, a pixel is considered visible if the estimated depth for the pixel in the previous frame is less than a real depth for the pixel in the previous frame.

The instructions for three-dimensional motion mapping 401 may also include performing motion estimation instructions 409 that are used to perform motion estimation for each sub-block of pixels in the current frame with a majority of occluded pixels. As discussed above, a pixel is considered occluded if the estimated depth for the pixel in the previous frame is greater than a real depth for the pixel in the previous frame.

The instructions for three-dimensional motion mapping 401 may further include deriving target motion vector instructions 411 that are used to derive target motion vectors for macroblocks or sub-macroblocks of the current frame comprising two or more adjoining sub-blocks each with best target motion vectors.

The instructions for three-dimensional motion mapping 401 may additionally include encoding video frame instructions 413 that are used to encode the current frame using the target motion vectors, best target motion vectors, and motion estimation results.

While the above is a complete description of the preferred embodiment of the present invention, it is possible to use various alternatives, modifications, and equivalents. Therefore, the scope of the present invention should be determined not with reference to the above description, but should, instead be determined with reference to the appended claims, along with their full scope of equivalents. Any feature described here, whether preferred or not, may be combined with any other feature described herein, whether preferred or not. In the claims that follow, the indefinite article "A" or "An" refers to a quantity of one or more of the item following the article, except where expressly stated otherwise. The appended claims are not to be interpreted as including means-plus-function limitations, unless such a limitation is explicitly received in a given claim using the phrase "means for".

What is claimed is:

1. A method for three-dimensional motion mapping in video encoding, comprising:
   a) performing a reverse three-dimensional transform for a set of anchor pixels in a current frame of video, thereby producing a set of reverse transformed anchor pixels by mapping two-dimensional coordinates associated with a pixel in the current frame to three-dimensional object coordinates, transforming the three-dimensional object coordinates into three-dimensional object coordinates associated with a corresponding pixel in a previous frame, and mapping the three-dimensional object coordinates associated with the corresponding pixel in the previous frame to two-dimensional coordinates associated with the corresponding pixel in a previous frame;
   b) for each reverse transformed anchor pixel, indicating whether the reverse transformed anchor pixel is occluded or visible, whereby the reverse transformed anchor pixel is indicated as occluded if an estimated depth for a corresponding pixel in a previous frame is greater than a real depth for the corresponding pixel in the previous frame, and whereby the reverse transformed anchor pixel is indicated as not occluded and therefore visible if the estimated depth for the corresponding pixel in the previous frame is not greater than a real depth for the corresponding pixel in the previous frame;
   c) constructing a motion vector map for at least a subset of the set of reverse transformed anchor pixels;
   d) deriving a best target motion vector for each section in a first set of sections in the current frame using the motion vector map or performing motion estimation for each section in a second set of sections in the current frame using the motion vector map, wherein the sections in the second set include occluded pixels;
   e) deriving target motion vectors for one or more groups of two or more sections of the current frame, each group comprising two or more adjoining sections each with best target motion vectors; and
   f) encoding the current frame using the target motion vectors, the best target motion vector for each section, or motion estimation results.

2. The method of claim 1, wherein the performing the reverse three-dimensional transform includes: deriving the estimated depth for the pixel in the previous frame.

3. The method of claim 1, wherein mapping the two-dimensional window coordinates associated with the pixel in the current frame to three-dimensional object coordinates associated with the pixel in the current frame involves using a model-view matrix, a projection matrix, and view parameters associated with the computer game.

4. The method of claim 1, wherein transforming the three-dimensional object coordinates associated with the pixel in the current frame into three-dimensional object coordinates associated with the pixel in the previous frame involves using a model-view matrix, a projection matrix, and view parameters associated with the computer game.

5. The method of claim 1, wherein mapping the three-dimensional object coordinates associated with the pixel in the previous frame to two-dimensional window coordinates associated with the pixel in the previous frame involves using a model-view matrix, a projection matrix, and view parameters associated with the video game.

6. The method of claim 1, wherein performing the three-dimensional transform further comprises updating a model-view matrix, a projection matrix, and view parameters.

7. The method of claim 1, wherein constructing the complete per pixel motion vector map involves determining a motion vector for each pixel in the current frame by calculating the difference between the 2-D window coordinates of the pixel in the current frame and the 2-D window coordinates of the pixel in the previous frame for a visible pixel or performing regular motion estimation for an occluded pixel.

8. The method of claim 1, wherein each section is a 4×4 array of pixels.

9. The method of claim 1, wherein each group of two or more sections is an 8×8 array of pixels.

10. The method of claim 1, wherein each group of two or more sections is a 16×16 array of pixels.

11. The method of claim 1, wherein deriving target motion vectors in e) involves using a pyramid motion vector formation.

12. The method of claim 1, wherein deriving the best target motion vector includes minimizing a cost for encoding a motion vector and a distortion given a target motion vector.

13. The method of claim 1, wherein d) includes deriving the best target motion vector for each section in the current frame with a majority of visible pixels or performing motion estimation for each section of pixels in the current frame with a majority of occluded pixels.

14. A system for implementing three-dimensional motion mapping, comprising:
- a processor;
- a memory; and
- computer-coded instructions embodied in the memory and executable by the processor, wherein the computer coded instructions are configured to implement a method for three-dimensional motion mapping of a current frame of a video game, the method comprising:
  a) performing a reverse three-dimensional transform for a set of anchor pixels in a current frame of video, thereby producing a set of transformed anchor pixels by mapping two-dimensional coordinates associated with a pixel in the current frame to three-dimensional object coordinates, transforming the three-dimensional object coordinates into three-dimensional object coordinates associated with a corresponding pixel in a previous frame, and mapping the three-dimensional object coordinates associated with the corresponding pixel in the previous frame to two-dimensional coordinates associated with the corresponding pixel in a previous frame;
  b) for each reverse transformed anchor pixel, indicating whether the reverse transformed anchor pixel is occluded or visible, whereby the reverse transformed anchor pixel is indicated as occluded if an estimated depth for a corresponding pixel in a previous frame is greater than a real depth for the corresponding pixel in the previous frame, and whereby the reverse transformed anchor pixel is indicated as not occluded and therefore visible if the estimated depth for the corresponding pixel in the previous frame is not greater than a real depth for the corresponding pixel in the previous frame;
  c) constructing a motion vector map for at least a subset of the set of reverse transformed anchor pixels;
  d) deriving a best target motion vector for each section in a first set of sections in the current frame using the motion vector map or performing motion estimation for each section in a second set of sections in the current frame using the motion vector map, wherein the sections in the second set include occluded pixels;
  e) deriving target motion vectors for one or more groups of two or more sections of the current frame, each group comprising two or more adjoining sections each with best target motion vectors; and
  f) encoding the current frame using the target motion vectors, the best target motion vector for each section, or motion estimation results.

15. The method of claim 14, wherein the performing the reverse three-dimensional transform includes: deriving the estimated depth for the pixel in the previous frame.

16. A computer program product comprising:
- a non-transitory, computer-readable storage medium having computer readable program code embodied in said medium for implementing a method for three-dimensional motion mapping of a current video frame in a computer game, the method comprising:
  a) performing a reverse three-dimensional transform for a set of anchor pixels in a current frame of video, thereby producing a set of transformed anchor pixels by mapping two-dimensional coordinates associated with a pixel in the current frame to three-dimensional object coordinates, transforming the three-dimensional object coordinates into three-dimensional object coordinates associated with a corresponding pixel in a previous frame, and mapping the three-dimensional object coordinates associated with the corresponding pixel in the previous frame to two-dimensional coordinates associated with the corresponding pixel in a previous frame;
  b) for each reverse transformed anchor pixel, indicating whether the reverse transformed anchor pixel is occluded or visible, whereby the reverse transformed anchor pixel is indicated as occluded if an estimated depth for a corresponding pixel in a previous frame is greater than a real depth for the corresponding pixel in the previous frame, and whereby the reverse transformed anchor pixel is indicated as not occluded and therefore visible if the estimated depth for the corresponding pixel in the previous frame is not greater than a real depth for the corresponding pixel in the previous frame;
  c) constructing a motion vector map for at least a subset of the set of reverse transformed anchor pixels;
  d) deriving a best target motion vector for each section in a first set of sections in the current frame using the motion vector map or performing motion estimation for each section in a second set of sections in the current frame using the motion vector map, wherein the sections in the second set include occluded pixels;
  e) deriving target motion vectors for one or more groups of two or more sections of the current frame, each group comprising two or more adjoining sections each with best target motion vectors; and
  f) encoding the current frame using the target motion vectors, the best target motion vector for each section, or motion estimation results.

17. The computer program product of claim 16, wherein the performing the reverse three-dimensional transform includes: deriving the estimated depth for the pixel in the previous frame.

* * * * *